United States Patent [19]

Hatanaka et al.

[11] Patent Number: 4,910,496
[45] Date of Patent: Mar. 20, 1990

[54] DIRECTION INDICATING FLASHER DEVICE FOR VEHICLES WITH FILAMENT FAILURE INDICATION

[75] Inventors: Kaoru Hatanaka, Saitama; Tetsuo Yamagata, Tokyo, both of Japan

[73] Assignee: Honda Giken Kogyo Kabushiki Kaisha, Tokyo, Japan

[21] Appl. No.: 142,208

[22] Filed: Jan. 11, 1988

[30] Foreign Application Priority Data

Jan. 8, 1987 [JP] Japan .................................. 62-2910
Mar. 13, 1987 [JP] Japan ................................ 62-58530

[51] Int. Cl.$^4$ ............................................. B60Q 1/46
[52] U.S. Cl. ................................ 340/458; 307/10.8; 340/438; 340/642
[58] Field of Search ............... 340/52 D, 55, 56, 85, 340/88, 81 R, 79, 80, 641, 642, 425.5, 438, 457, 458, 468; 307/10.8; 315/130

[56] References Cited

U.S. PATENT DOCUMENTS

| | | | |
|---|---|---|---|
| 3,806,868 | 4/1974 | Portman | 340/52 D |
| 3,973,238 | 8/1976 | Kato et al. | 340/81 R |
| 4,068,216 | 1/1978 | Brouwer et al. | 340/641 |
| 4,105,996 | 8/1978 | Shimizu | 340/81 R |
| 4,173,750 | 11/1979 | Riba | 340/80 |
| 4,550,303 | 10/1985 | Steele | 340/52 D |
| 4,660,020 | 4/1987 | Miyamaru et al. | 340/56 |
| 4,668,946 | 5/1987 | Volk et al. | 340/79 |
| 4,792,701 | 12/1988 | Olon et al. | 340/81 R |

Primary Examiner—Joseph A. Orsino
Assistant Examiner—Brent A. Swarthout
Attorney, Agent, or Firm—Birch, Stewart, Kolasch & Birch

[57] ABSTRACT

A flasher device flashes a selected one of a plurality of groups of indicator lamps selected by a flasher starting switch. An intermittent voltage is supplied to the selected group of indicator lamps to cause the lamps to flash. A capacitor is operatively connected to the selected group of indicator lamps and the rate of change of the voltage across the capacitor is indicative of the resistance of the selected group of indicator lamps. The frequency of the intermittent voltage supplied to the indicator lamps to flash the lamps is varied in response to the rate of change of the voltage across the capacitor. As the rate of change of voltage across the capacitor varies in relationship to the resistance of the selected group of indicator lamps, the change in the frequency of the intermittent voltage supplied the indicator lamps and thus the flash rate of the indicator lamps is representative of the resistance of the group of lamps. Thus the flash rate indicates to the operator of the vehicle when a filament has been broken. An audible announcement of the automatic reset of the flasher may also be developed.

20 Claims, 6 Drawing Sheets

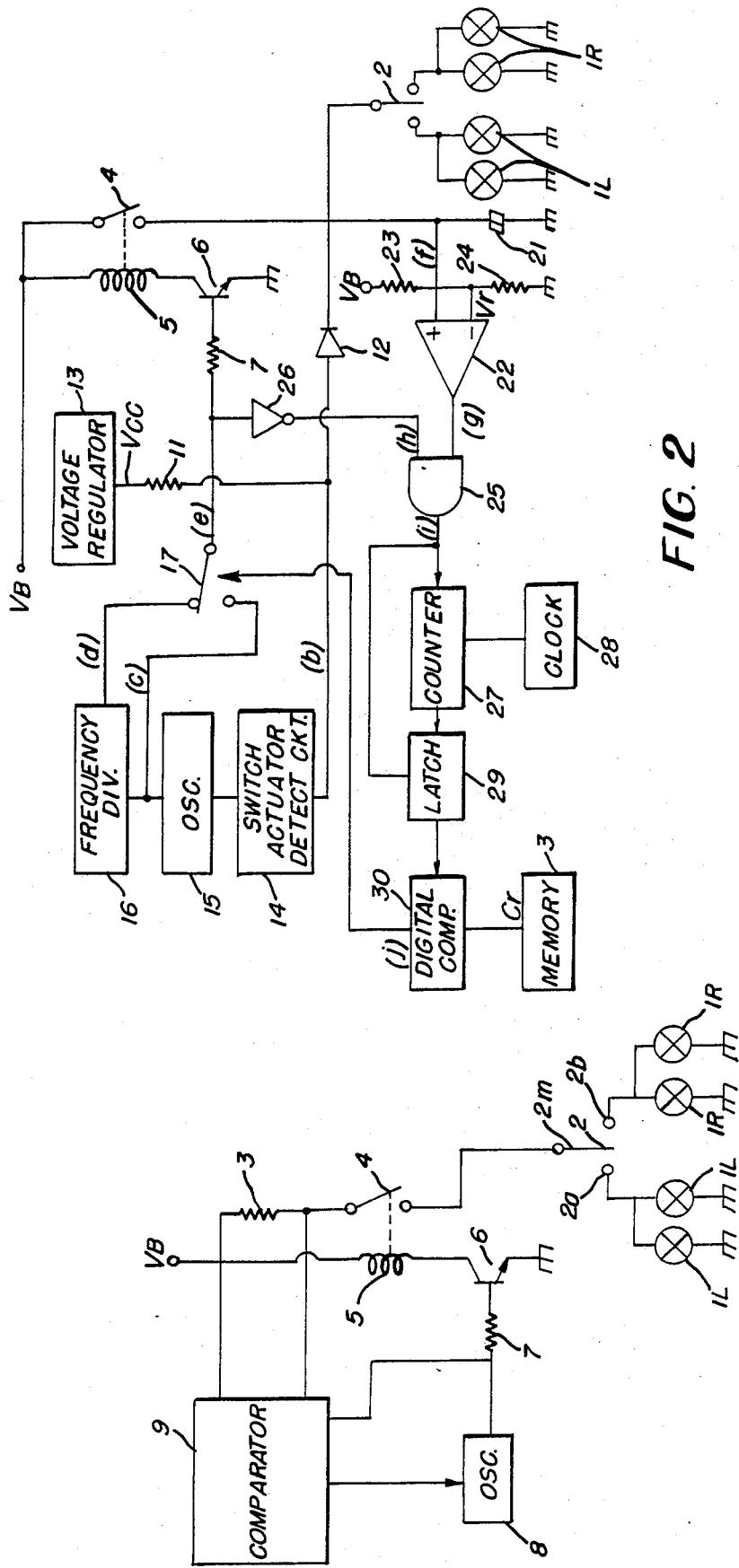

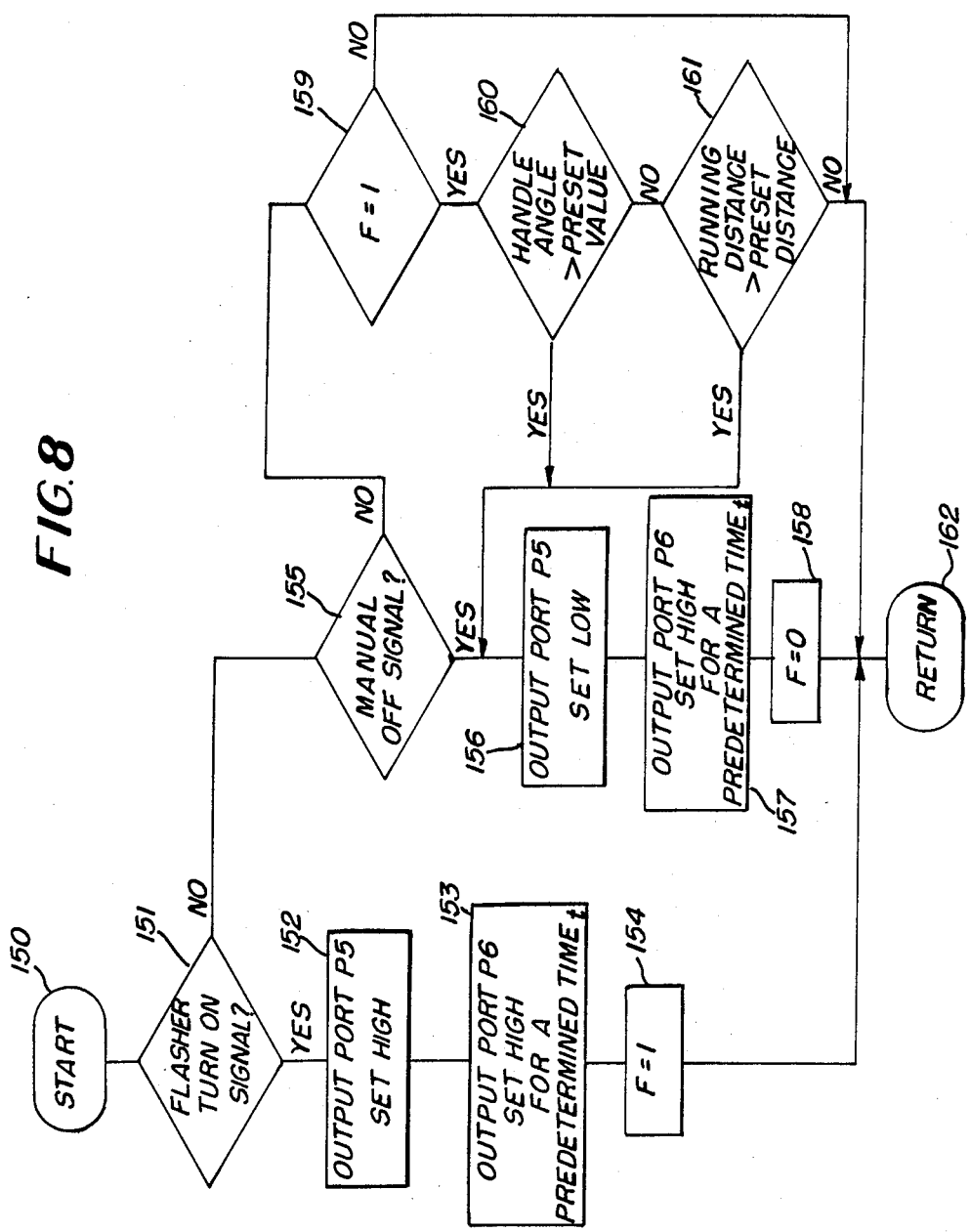

DIRECTION INDICATING FLASHER DEVICE FOR VEHICLES WITH FILAMENT FAILURE INDICATION

The present invention relates to a flasher device and more particularly to a flasher device for use in a vehicle such as an automobile or motorcycle.

BACKGROUND OF THE INVENTION

In a prior art flasher device as illustrated in FIG. 1, turn signals or direction indicating lamps provided on a vehicle are controlled. This flasher device is disclosed in Japanese patent publication No. 57-50690 (50690/1982). In this device, there are provided pairs of left and right direction indicating lamps or turn signals 1L, 1R. These lamps 1L, 1R are alternatively selected by actuation of a flasher starting switch 2. The flasher starting switch 2 is provided with an intermediate position which provides a non selected condition. The stationary contacts 2a, 2b of the starting switch 2 are connected to the direction indicating lamps 1L and 1R. A movable contact 2m of the starting switch 2 is supplied a supply voltage $V_B$ via a current detecting resistor 3 and a relay switch 4. The relay switch 4 is turned on when a relay coil 5 is energized. One end of the relay coil 5 is supplied the supply voltage $V_B$ and the other end of the relay coil 5 is selectively grounded via a collector and an emitter of a switching transistor 6.

The base of the switching transistor 6 is connected an oscillator 8 via a resistor 7. The voltage developed across the current detecting resistor 3 is supplied to a discriminator circuit 9. In the preferred embodiment the discriminator circuit is formed of a comparator. The discriminator circuit 9 determines whether there has been a disconnection or failure of a filament of one of the pairs of direction indicating lamps 1L and 1R from the voltage $V_B$ supplied the lamps 1L, 1R via the current detecting resistor 3. The output of this discrimination circuit 9 is supplied to the oscillator 8. The oscillator 8 is constructed so that when the flasher starting switch 2 is operated to turn on one of the pairs of lamps 1L, 1R, the oscillating actuation is started, for example, by a switch associated with the starting switch 2 so as to generate an oscillating signal which is provided to the transistor 6. The oscillator circuit is responsive to the output of the discrimination circuit 9 so that the oscillation frequency varies according to the output of the discriminator circuit 9.

In such a structure, when the starting switch 2 is operated by movement from the intermediate position to one stationary contact, the oscillator 8 begins oscillation and the oscillating signal is supplied to the base of the transistor 6 via the resistor 7. As a result, the transistor 6 starts its ON/OFF actuation and the voltage V is applied intermittently to the relay coil 5 with the oscillating frequency of the oscillator 8. Accordingly, since the relay switch 4 turns on and off, the electric current due to the voltage $V_B$ flows intermittently to ground through the resistor 3, the relay switch 4, the starting switch 2 and the selected pair of direction indicating lamps 1L or 1R thereby allowing the direction indicating lamps 1L or 1R to flash. During this time, the current which flows in the selected pair of direction indicating lamps 1L or 1R is detected by the resistor 3. The output of the discriminator circuit 9 inverts from a low level output to a high level output when the voltage across the resistor 3 drops below a required voltage when the transistor 6 turns on. The oscillator 8 changes its oscillating frequency according to the high level output. For example, if the filament of one lamp of the selected pair is broken when the two direction indicating lamps 1L are flashing, since the current which flows through the series circuit consisting of the resistor 3, the relay switch 4, the starting switch 2 and the other direction indicating lamp 1L reduces to about ½ the normal current, the voltage across the resistor 3 falls below the required voltage causing the output of the discriminator circuit 9 to go high and thus raising the oscillating frequency of the oscillator 8. Accordingly, the flashing becomes faster at the other direction indicating lamp 1L whereby the vehicle driver may discover the breakdown of the filament of the one direction indicating lamp 1L.

In such a flasher device, it is necessary to provide a current detecting resistor in a current path of the direction indicating lamp. Accordingly, the resistance of the current detecting resistance lowers the voltage across the direction indicating lamps, thus lowering the luminous intensity of the direction indicating lamps and reducing power consumption efficiency.

A flasher device is disclosed in Japanese patent laid open No. 55-140622 (No. 140622/1980) which overcomes the disadvantages of the FIG. 1 Prior Art. This laid open application discloses a device in which a resistor is provided in parallel with a relay switch and an electric current is supplied to direction indicating lamps through the resistor during the turned off period of the direction indicating lamps whereby a breakdown of the direction indicating lamp is detected from a terminal voltage of the direction indicating lamp immediately after turning off the relay switch. However, since it is necessary to always supply some current to the direction indicating lamp, electric power is very wastefully consumed.

Such a flashing device carried on a vehicle, usually is provided with an automatic cancelling function which automatically cancels flashing of a direction indicating lamp, for example, according to a turning angle of a handle, a travelling distance or the like. This is convenient, since in such a device it is sufficient to operate a flasher switch only when starting the flashing of the direction indicating lamp. It is desirable for the operation of the automatic cancelling function to be announced to the vehicle operator when the vehicle is travelling and where the flashing of the direction indicating lamp has been automatically cancelled.

As a device of this kind, Japanese laid open patent No. 50-139689 (No. 139689/1975) discloses a device which generates flashing actuation sounds from a speaker or the like according to a flashing period during the flashing of a lamp. However, in such a communication, the sound is always generated during the flashing of the lamp and is therefore offensive to the ear and increases the consumption of electric power.

SUMMARY OF THE INVENTION

It is an object of the present invention to provide a flasher device which exhibits enhanced power consumption efficiency and which changes the flashing frequency of the undamaged lamp when the filament of a damaged one of at least two lamps has broken.

It is another object of the present invention to provide a flasher device for indicating the turning direction of a vehicle which exhibits reduced power consumption and which generates an audible indication of the starting or the cancellation of flashing.

These and other objects of the present invention are accomplished by virtue of the novel flasher device and circuit described in the present application.

The flasher device of the present invention utilizes a capacitor connected in a series circuit of a plurality of lamps and a starting switch, and driving means which allows a driving switch such as a relay switch or the like to turn on and off and which changes the frequency for turning on and off the driving switch according to a charging or discharging speed of the voltage accumulated in the capacitor during an actuation of the driving switch to thereby indicate a filament failure.

The flashing device of the present invention may also comprise a parallel circuit of a switching element connected in series with a plurality of lamps connected in parallel with each other and a capacitor, a power supply which applies a voltage to a series circuit of said plurality of lamps and said parallel circuit, driving means for allowing said switching element repeatedly to turn on and off according to a flasher starting command, and detecting means for detecting a breakdown of said plurality of lamps according to an increasing speed of an accumulated voltage of said capacitor in the OFF state of said switching element.

The flasher device carried on a vehicle according to the teachings of the present invention is further provided with announcement sound generating means for generating an announcement sound only for a short time when automatic cancellation of the flashing action occurs.

BRIEF DESCRIPTION OF THE DRAWINGS

The present invention will become better understood by reference to the detailed description presented hereinbelow in conjunction with the attached drawings wherein:

FIG. 1 is a circuit diagram showing a prior art example of a flasher device;

FIG. 2 is a circuit diagram showing one embodiment of the flasher device of the present invention;

FIG. 8 is a flow chart showing the control program for the CPU in the device of FIG. 7.

DETAILED DESCRIPTION OF THE PREFERRED EMBODIMENTS

Figure 3:
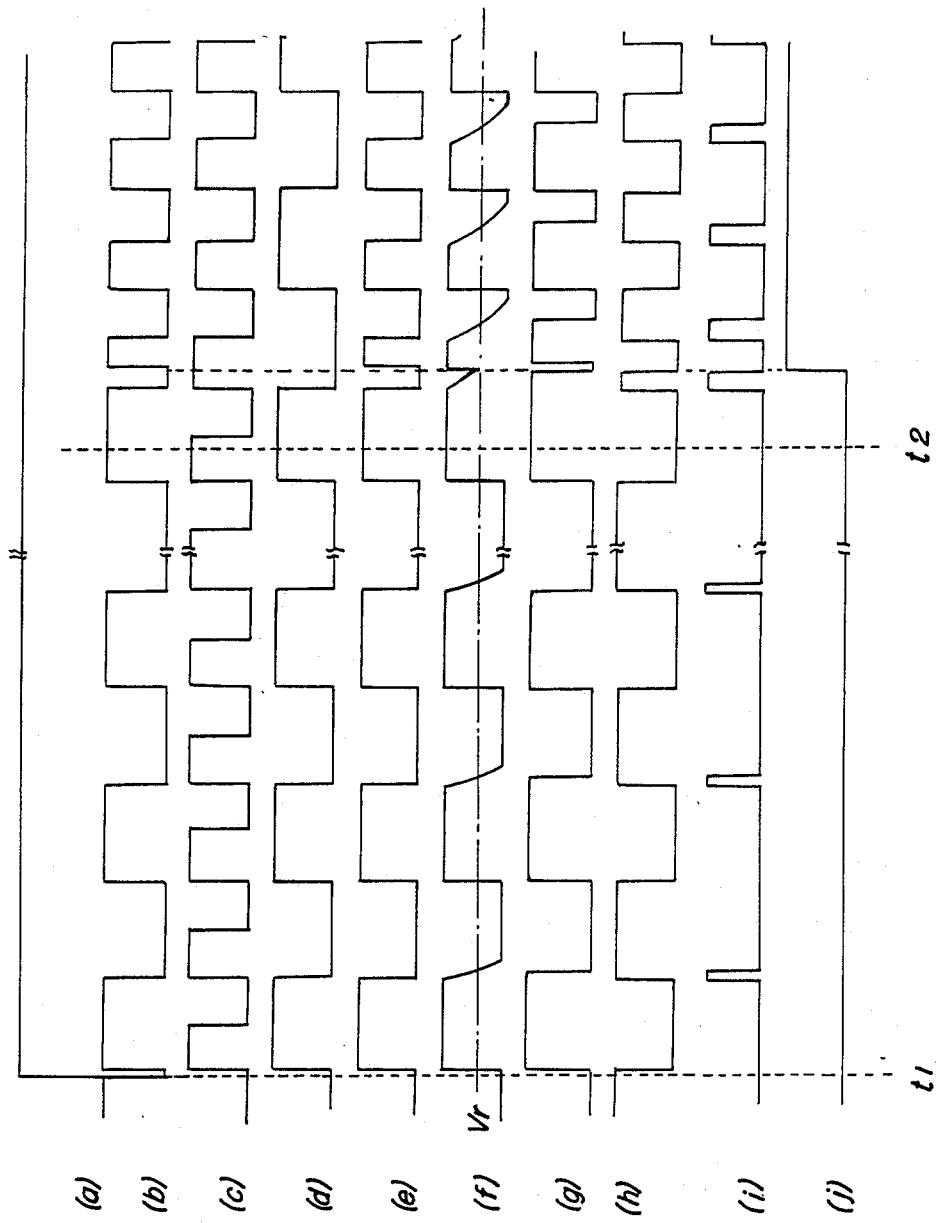
FIG. 3(a-i) illustrate various waveforms developed by the device of FIG. 2.

An embodiment of the present invention will be described below with reference to FIGS. 2 and 3.

FIG. 2 shows a flasher device which is one embodiment of the present invention and which is carried on a vehicle for indicating directions. In the flasher device shown in FIG. 2, the same parts as those of the device shown in FIG. 1 are represented by the same reference numerals. Throughout the present application like elements are designated by like reference numerals.

A power voltage $V_B$ (for example, 12 V) is applied to a series circuit consisting of a relay switch 4, a flasher starting switch 2 and direction indicating lamps 1L and 1R. An intermediate voltage $V_{cc}$ (for example, 5 V) is supplied to a connecting point between the relay switch 4 and the starting switch 2 through a resistor 11 and a diode 12 biased in the forward direction. The voltage $V_{cc}$ is obtained by stabilizing the power voltage $V_B$ through the use of a voltage regulator 13. A switch actuation detection circuit 14 is connected to a point between the resistor 11 and the diode 12 in order to detect an ON actuation of the starting switch 2. The detector circuit 14 comprises a flip flop, a counter or the like, and generates a high level output according to a drop in the voltage of the input signal provided thereto. The high level output developed by the switch actuation detection circuit 14 is maintained for a predetermined time after the input signal has risen only after this predetermined time has expired is the output of the switch actuation detection circuit 14 returned to a low level output. The output of the detector circuit 14 is connected to an oscillator 15 which is designed to perform its oscillating actuation only during a time when the high level output of the detector circuit 14 is supplied to the oscillator 15. A frequency divider 16 is connected to the oscillator 15, and an output signal of the oscillator 15 and an output signal of the frequency divider 16 may be alternatively selected by a switch 17. A movable contact of selected output end of the switch 17 is connected with a base of a transistor 6 through a resistor 7.

A capacitor 21 is connected across the series circuit of the starting switch 2 and the direction indicating lamps 1L and 1R to form a parallel circuit. The voltage developed across the capacitor 21 is supplied to a voltage comparator circuit 22. A voltage divided from the voltage $V_B$ by means of resistors 23 and 24 is also supplied to the comparator circuit 22 as a reference voltage Vr. Output of the comparator circuit 22 is connected to a first input of an AND circuit 25. The output signal selected by switch 17 is inverted by an inverter 26 and is supplied to the second input of the AND gate or circuit 25. The AND gate develops a logical product between the output signal of the comparator circuit 22 and the signal inverted by the inverter 26 from the selected output signal of the switch 17. A digital counter 27 is connected to an output of the AND gate 25. The digital counter 27 counts clock pulses delivered from a clock generating circuit 28 according to the output signal of the AND circuit 25. The counting value of the digital counter 27 is supplied to a digital comparator circuit 30 via a latch circuit 29 and is compared with a reference value delivered from a memory 31. Memory 31 may be of any suitable type but is, in the preferred embodiment, a permanent random access memory such as a Read Only Memory (ROM) or the like. The latch circuit 29 reads the value counted by the digital counter 27 in response to the output signal of the AND circuit 25 and holds and outputs this counted value. An output signal of the comparator circuit 30 is supplied to a control end of the switch 17 so as to control the selecting actuation of the switch 17.

In the preferred embodiment there may also be a circuit (not shown in FIG. 2) provided between both terminals of a relay coil 5 in order to absorb inverse electromotive forces generated between the terminals of the relay coil 5 when the transistor 6 is turned off.

The operation of the flasher device according to the present invention having the structure of FIG. 2 is best understood with reference to the waveforms of FIG. 3. These waveforms of FIG. 3 are developed by the FIG. 2 circuit at the points indicated with the lower case letters when the starting switch 2 is operated at a point of time $t_1$, as shown in FIG. 3(a) and is turned on from the intermediate position to one stationary contact. The electric current flows from an output of the voltage regulator 13 to ground through the resistor 11, the diode 12, the starting switch 2 and the direction indicating lamps 1L or 1R. Therefore, an input voltage of the switch actuation detector circuit 14 lowers from the voltage $V_{cc}$ below a required voltage as shown in FIG. 3(b). The switch actuation detector circuit 14 supplies the high level output representing the ON state of the starting switch 2 to the oscillator 15 when the detector circuit 14 detects the falling of this voltage of FIG. 3(b).

The high level output of the switch actuation detection causes the oscillator 15 to start oscillation so as to generate a first oscillating signal (for example, 170 cpm) as shown in FIG. 3(c). The first oscillating signal is frequency divided by the frequency divider 16 to develop a second oscillating signal (for example, 85 cpm) as shown in FIG. 3(d). When the output level of the comparator circuit 30 is a low level, that is, when no breakdown occurs in a filament of a direction indicating lamp 1L or 1R being selected by the starting switch 2, the switch 17, as shown in FIG. 3(e), relays the second oscillating signal delivered from the frequency divider 16 to the base of the transistor 6 through the resistor 7. The transistor 6 supplies current intermittently to the relay coil 5 by turning the current on and off in response to the second oscillating signal. Therefore, since the relay switch 4 turns on and off, the current due to the voltage $V_B$ flows intermittently to ground via the relay switch 4, the starting switch 2 and the direction indicating lamps 1L or 1R to thereby allow the direction indicating lamps 1L or 1R to flash.

As shown in FIG. 3(f), the terminal voltage of the capacitor 21 becomes equal to the voltage $V_B$ during the ON state of the relay switch 4. The terminal voltage of the capacitor 21 is gradually discharged since the charge accumulated in the capacitor 21 flows through the starting switch 2 and the direction indicating lamps 1L and 1R during the OFF state of the relay switch 4. When the terminal voltage of the capacitor 21 is larger than a reference voltage Vr, the output of the comparator circuit 22 develops a high level output as shown in FIG. 3(g). Also, since the output level of the inverter 26 is an inversion of the signal delivered from the switch 17 as shown in FIG. 3(h), the AND circuit 25, as shown in FIG. 3(i), generates as a time signal a high level pulse which represents a transient state of the terminal voltage of the capacitor 21. According to the occurrence of this pulse, the digital counter 27 is reset and counts the clock pulse from an initial value. When the high level pulse disappears, the digital counter 27 stops counting and its counting value is held in the latch circuit 29. The counting value C held in the latch circuit 29 is compared with a reference value Cr in the comparator circuit 30. In a normal case in which no filament breakage is present in a selected direction indicating lamp 1L or 1R, since the terminal voltage of the capacitor 21 is rapidly lowered, the counting value C is smaller than the reference value Cr. Accordingly, the comparator circuit 30 develops a low level output as mentioned above.

In an abnormal case where the direction indicating lamps 1L are selected by the starting switch 2 and where a filament breakage exists in the filament of one of the direction indicating lamps 1L at a point of time $t_2$, since the load to the capacitor 21 becomes small, the electric charge accumulated in the capacitor 21 flows as a current only in the starting switch 2 and the other one of the pair of direction indicating lamps 1L during the OFF state of the relay switch 4. In this case, the discharge speed for the terminal voltage of the capacitor 21 becomes lower when compared with prior to the breakdown of the filament. The counting value C becomes larger than the reference value Cr since the time until the terminal voltage reaches the reference voltage Vr after the relay switch 4 has inverted to the OFF state, that is, the time period of the high level pulse delivered from the AND circuit 25 becomes longer. Accordingly, the output level of the comparator circuit 30 is developed as a high level as shown in FIG. 3(j), and by this high level, the switch 17 is driven and relays the first oscillating signal from the oscillator 15 to the base of the transistor 6 through the resistor 7. Since the transistor 6 supplies the current to the relay coil 5 intermittently by turning on and off according to the first oscillating signal, a flashing frequency of the other one of the pair of direction indicating lamps 1L, becomes higher (for example, double). This higher flashing speed enables the driver to discover the breakage of the filament of one of the direction indicating lamps 1L. The filament breakage may be therefore discovered when either of the direction indicating lamps 1L becomes defective.

On the one hand, the starting switch 2 is operated to the intermediate position to turn off the direction indicating lamp and the input voltage of the switch actuation detector circuit 14 continues in a condition equal to the voltage $V_{cc}$. Since the output of the switch actuation detector circuit 14 changes from the high level output to the low level output only after a predetermined time period after the input voltage has risen to the voltage $V_{cc}$ (for example, a time of one and a half times of a period of the second oscillating signal), the oscillator 15 stops its oscillation.

The above described embodiment of the present invention is constructed to perform all necessary functions utilizing hardwired circuitry. However, it is possible to perform these functions by supplying the terminal voltage of the capacitor 21 to a microprocessor after its analog/digital conversion and using the microprocessor to supply the first oscillating signal or the second oscillating signal to the base of the transistor 6 via the resistor 7 as mentioned above by the microprocessor performing repeatedly a required program.

In the embodiment of the present invention mentioned above, if a breakage occurs in the filament of the one lamp, the flashing frequency of the lamp becomes higher. However, it is possible to lower the flashing frequency or to stop the flashing of the lamp and in place of flashing, to keep the lamp in a lighted state.

Also, in the embodiment of the present invention mentioned above, the breakage of the filament of the lamp is determined from the terminal voltage of the capacitor 21 in the OFF period of the relay switch 4, that is, from a time until the accumulated voltage lowers to the reference voltage Vr. However, the present invention is not limited to such a manner of determining filament breakage and therefore, the breakage of the filament may be determined from the voltage drop of the terminal voltage of the capacitor 21 per unit time.

Figure 4:
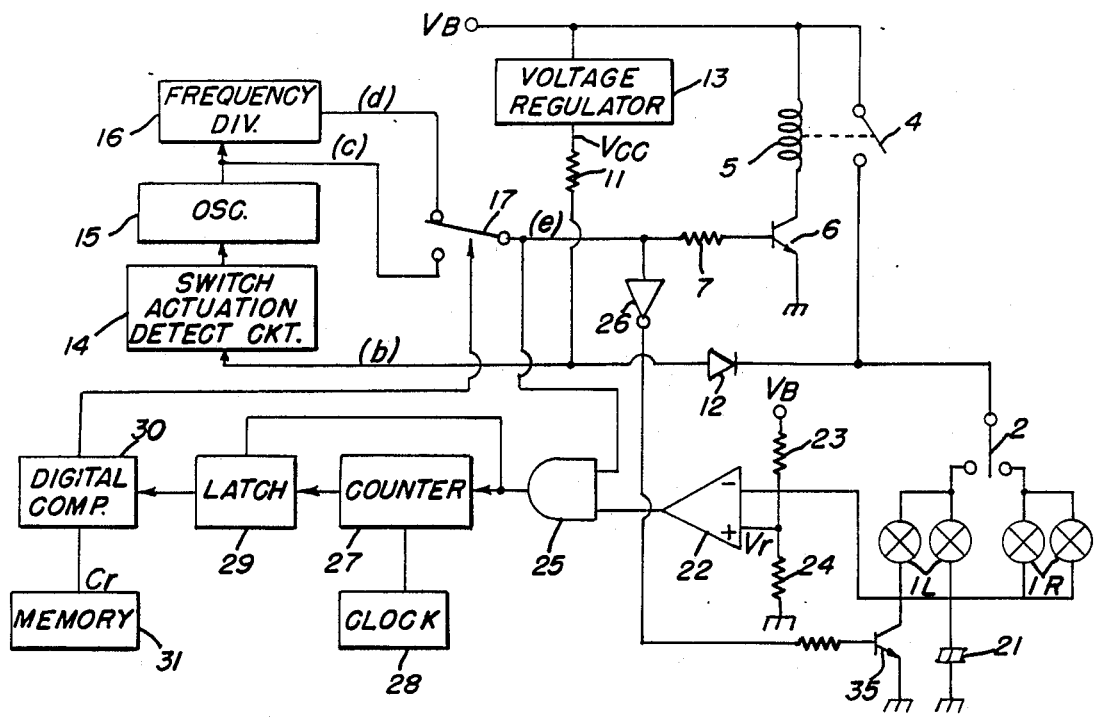
FIG. 4 is a circuit diagram showing another embodiment of the flasher device of the present invention which is a variation of the FIG. 2 circuit.

Further, in the embodiment of the present invention mentioned above, the breakage of the filament is determined according to the discharge speed of the accumulated voltage of the capacitor. However, in the present invention as illustrated in FIG. 4, the breakage of the filament may be determined according to an increasing speed of a charging voltage of the capacitor 21 during the ON state of the transistor 6 by connecting the capacitor 21 in series with the series circuit of the starting switch 2 and direction indicating lamps lL or lR. In the circuit in FIG. 4, a transistor 35 is provided to turn on during the ON state of the transistor 6 and to allow the accumulated charge of the capacitor 21 to discharge. Otherwise, the circuit of FIG. 4 operates in a like manner to the circuit of FIG. 2.

Figure 6:
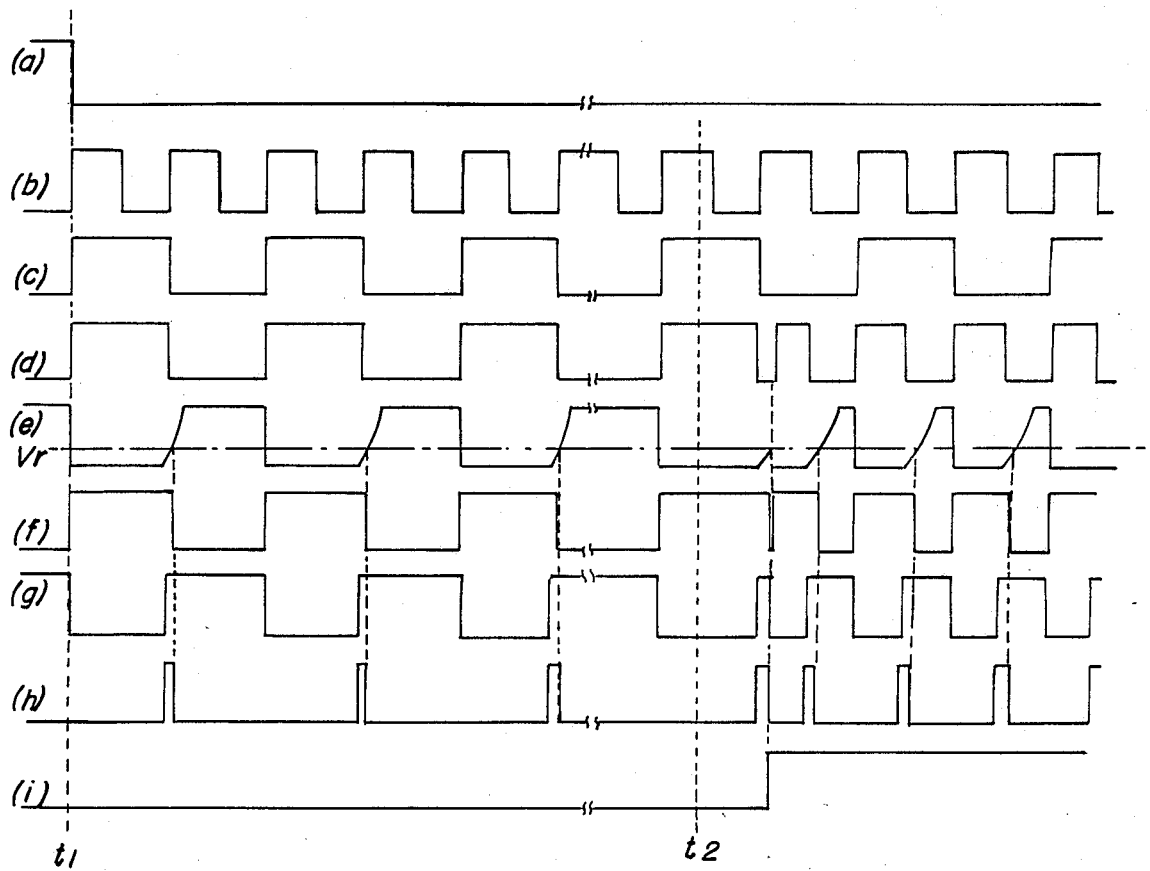
FIG. 6(a-i) illustrate various waveforms developed by the device of FIG. 5.

Another embodiment of the present invention will be described below with reference to FIGS. 5 and 6.

Figure 5:
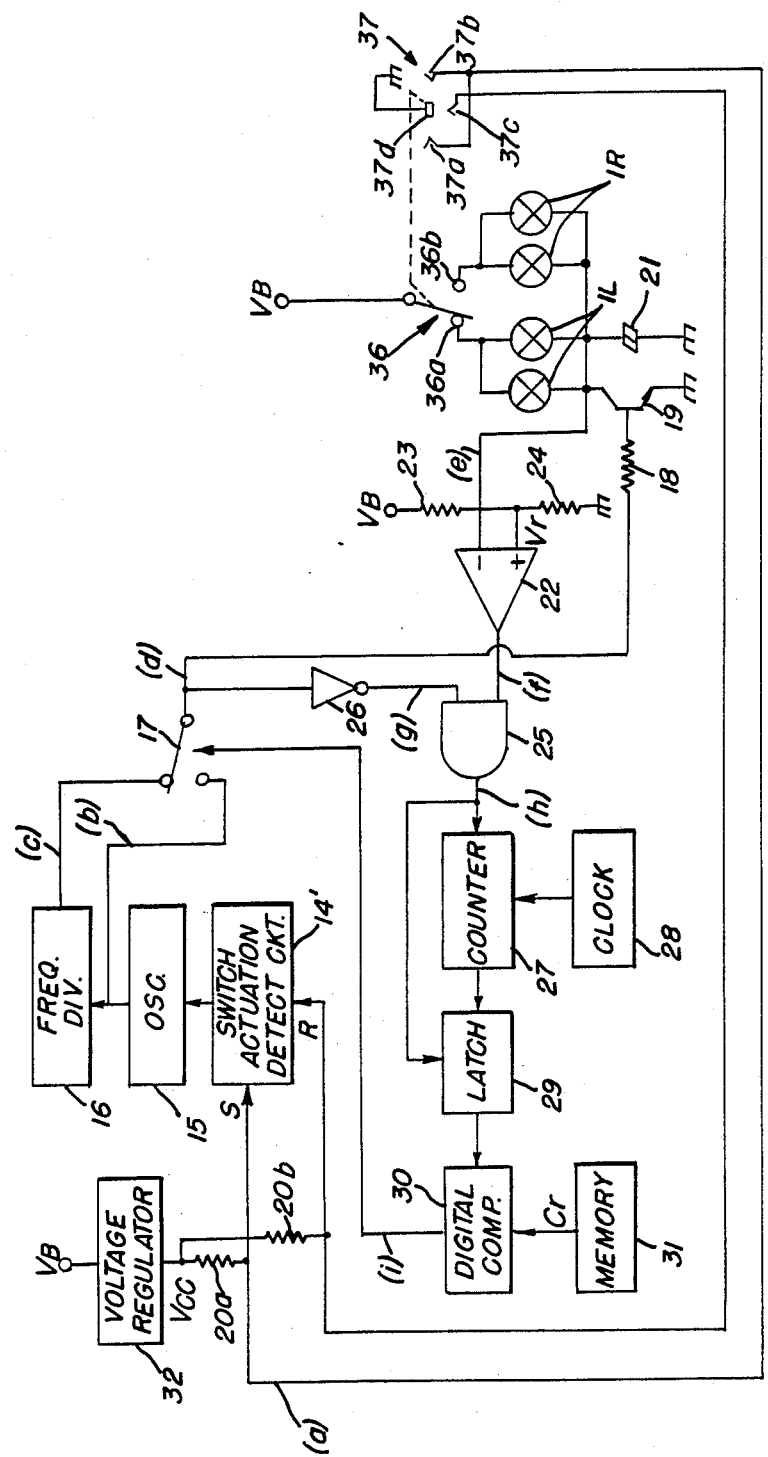
FIG. 5 is a circuit diagram showing another embodiment of the flasher device of the present invention.

FIG. 5 shows a flasher device according to another embodiment of the present invention and which is carried on a vehicle for indicating directions. There are provided a flasher starting switch or direction indicating and selecting switch 36 and a flasher switch 37 intended to operate with a common manipulator (not shown). The direction indicating and selecting switch 36 consists of a two position lock switch which does not have an intermediate position and stationary contacts 36a and 36b which are connected to the direction indicating lamps lL and lR. A voltage $V_B$ (for example, 12 V) is supplied to a movable contact of the direction indicating and selecting switch 36.

The flasher switch 37 consists of a non-locking switch having three stationary contacts 37a, 37b and 37c. A movable contact 37d of the flasher switch 37 is grounded. A switch actuation detection circuit 14' is connected to the stationary contacts 13a, 13b and 13c in order to detect an ON actuation of the flasher switch 13 and functions in a similar manner to the switch actuation detection circuit 14 of FIG. 2. The switch actuation detector circuit 14' consists of a flip flop and generates a high level output according to a falling of an input signal level of a terminal S connected with the stationary contacts 37a and 37b. The switch actuation detector 14 returns to a low level output in response to a rise in an input signal level supplied to a terminal R connected with the stationary contact 37c. A voltage $V_{cc}$ is supplied to the connecting line of the stationary contacts 37a and 37b through the resistor 20a and to the connecting line of the stationary contact 37c through a resistor 20b. An oscillator 15 is connected with an output of the switch actuation detector circuit 14'. The oscillator 15 performs in the same manner as that with like number in FIG. 2. The oscillator 15 is connected to a frequency divider 16, whereby an output signal of the oscillator 15 and output signal of the frequency divider 16 are alternately selected by means of a frequency switching switch 17 in the same manner as in FIG. 2. The movable contact of the frequency switching switch 17 is connected to a switch 19. In the preferred embodiment, a base of NPN transistor 19 is connected to the movable contact of the frequency switching switch 17 via a resistor 18. A collector of the transistor 19 is connected with a common connecting line of the direction indicating lamps lL and lR and an emitter of the transistor 19 is grounded.

The capacitor 21 is connected in parallel between the collector and emitter of the transistor 19 in a manner similar to that of FIG. 4. The voltage across the capacitor 21 is supplied to a voltage comparator circuit 22 which is also supplied a voltage divided from the voltage $V_B$ by means of resistors 23 and 24 as a reference voltage Vr. In a manner similar to that of FIG. 2, the output of the comparator circuit 22 is connected to the digital counter 27 via AND circuit 25 which is also gated by a signal inverted by the inverter 26 from the selected output signal of the switch 17. As in FIG. 2, the counting value of the digital counter 27 is supplied to the digital comparator circuit 30 via the latch circuit 29 and is compared with a reference value delivered from the memory 31. The output signal of the comparator circuit 30 is then supplied to the control end of the switch 17 so as to control the selecting actuation of the switch 17. In this embodiment, the voltage $V_{cc}$ is obtained by stabilizing the voltage $V_B$ by means of a voltage regulator 32.

In the flasher device of the embodiment of the present invention of FIG. 5, if the manipulator is moved in one required direction, the direction indicating and selecting switch 36 is placed in an ON state with respect to the stationary contact 36a and the movable contact 37d and the stationary contact 37a of the flasher switch 37 are also connected in the ON state. This constitutes a flasher starting command at time $t_1$. Waveforms illustrating the operation of the FIG. 5 circuit are illustrated in FIG. 6. Then, since the input level of the terminal S of the switch actuation detector circuit 14' inverts from the high level to the low level as shown in FIG. 6(a), when the switch actuation detector circuit 14' detects the falling level due to this level inversion, the detector circuit 14' supplies the high level output to oscillator 15. Accordingly, the oscillator 15 starts its oscillation and generates a first oscillating signal (for example, 170 cpm) as shown in FIG. 6(b). This first oscillating signal is frequency divided by the frequency divider 16 and leads to a second oscillating signal (for example, 85 cpm) as shown in FIG. 6(c). When the output level of the comparator circuit 30 is in a low level, that is, when no breakage is present in the filament of any one of the direction indicating lamps lL or lR being selected by the direction indicating and selecting switch 12, the frequency switching switch 17, as shown in FIG. 6(d), relays the second oscillating signal delivered from the frequency divider 16 through the resistor 18. Since the transistor 19 turns on and off in response to the second oscillating signal, the current due to the voltage $V_B$ flows intermittently to ground via the direction indicating and selecting switch 12 and the direction indicating lamps lL, thereby causing the direction in dictating lamps lL to flash.

When the manipulator of the switches 36 and 37 is pushed, the condition of the switch 36 is maintained and the movable contact 37d and the stationary contact 37c of the flasher switch 37 are connected in the ON state. As a result, since the input level of the terminal R of the switch actuation detector circuit 14' inverts from the high level to the low level, when the switch actuation detector circuit 14' detects the falling voltage due to this level inversion, the detector circuit 14' supplies the low level output to the oscillator 15. Accordingly, since the oscillator stops oscillating, the transistor 19 turns OFF and the flashing of the direction indicating lamp Ll stops.

If the manipulator is moved in parallel in the other desired direction, the direction indicating and selecting switch 36 is placed in the ON state with respect to the stationary contact 36b, and the movable contact 37d and the stationary contact 37b of the flasher switch 37 are connected in the ON state. By this, the direction indicating lamps lR flash according to the same actuation as the case where the movable contact 37d and the stationary contact 37a are contacted in the ON state as mentioned above.

When the transistor 19 is in the ON state, since the capacitor 21 is allowed to short-circuit at both ends, the accumulated charge across the capacitor 21 discharges and the voltage across the capacitor becomes 0 V.

When the transistor 19 is in the OFF state, the current due to the voltage $V_B$ flows through the direction indicating and selecting switch 12, the direction indicating lamps lL or lR, the capacitor 21 and the to ground, whereby the capacitor 21 is charged and the voltage across the capacitor 21 rises as shown in FIG. 6(e). When the terminal voltage of the capacitor 21 is smaller than a reference voltage Vr, the output level of the comparator circuit 22 leads to the high level as shown in FIG. 6(f). Also, since the output level of the inverter 26 is an inverted signal of the signal delivered from the frequency switching switch 17 as shown in FIG. 6(g), the AND circuit 25 generates a high level pulse, as shown in FIG. 6(h), which represents a time until the voltage across the capacitor 21 changes from 0 V to the reference voltage $V_r$. As a result of the occurrence of this pulse, the digital counter 27 is reset and counts the clock pulse from an initial value. When the high level pulse disappears, the digital counter 27 stops the counting and its counting value is held in the latch circuit 29. The counting value C held in the latch circuit 29 is compared with a reference value Cr in the comparator circuit 30. In a normal case in which a breakage does not appear in the filament of one of the direction indicating lamps lL or lR being selected, since the terminal voltage of the capacitor 21 rises rapidly, the counting value C is smaller than the reference value Cr. Accordingly, the output level of the comparator circuit 30 leads to the low level.

In an abnormal case where one of the direction indicating lamps lL or lR is selected by the direction indicating and selecting switch 36 and a filament breakage exists in a filament of one of the direction indicating lamps lL at a point of time $t_2$, since the current introduced into the capacitor decreases, the rising speed of the voltage across the capacitor 21 is slower than before the breakage of the filament. The counting value C therefore becomes larger than the reference value Cr since a time until the terminal voltage reaches the reference voltage Vr after the transistor 19 has inverted to the OFF state, that is, a time width of the high level pulse delivered from the AND circuit 25 becomes longer. Accordingly, the output level of the comparator circuit 30 goes high as shown in FIG. 6(i), and by this high level, the switching switch 17 is driven and relays the first oscillating signal from the oscillator 15 to the base of the transistor 19 through the resistor 18. Since the transistor 19 turns on and off according to the first oscillating signal, a flashing frequency of the other one of the direction indicating lamps lL becomes higher (for example, double), whereby the vehicle driver may discover the breakdown of one filament of one of the direction indicating lamps lL. The increased flashing frequency allows driver detection of breakdown of any filament of the direction indicating lamps lR, lL.

The above described embodiment of the present invention is constructed to perform all necessary functions utilizing hardwired circuitry. However, it is also possible to perform these functions by supplying the terminal voltage of the capacitor 21 to a microprocessor after its analog/digital conversion and using the microprocessor to supply the first oscillating signal or the second oscillating signal to the base of the transistor 19 via the resistor 18 as mentioned above by the microprocessor performing repeatedly the required program.

In the embodiment of the present invention mentioned above, if the breakage occurs in the filament of one lamp, the flashing frequency of the lamp increases. However, it is possible to lower the flash frequency and to stop the flashing of the lamps instead by keeping the lamps constantly lit.

In the embodiment mentioned above, the capacitor 21 is connected directly with the connecting line which connects the collector of the transistor 19 with the direction indicating lamp. However, the capacitor 21 may be connected with this connecting line through a current regulating resistor so as to supply the voltage across the input of the comparator circuit 22.

Figure 7:
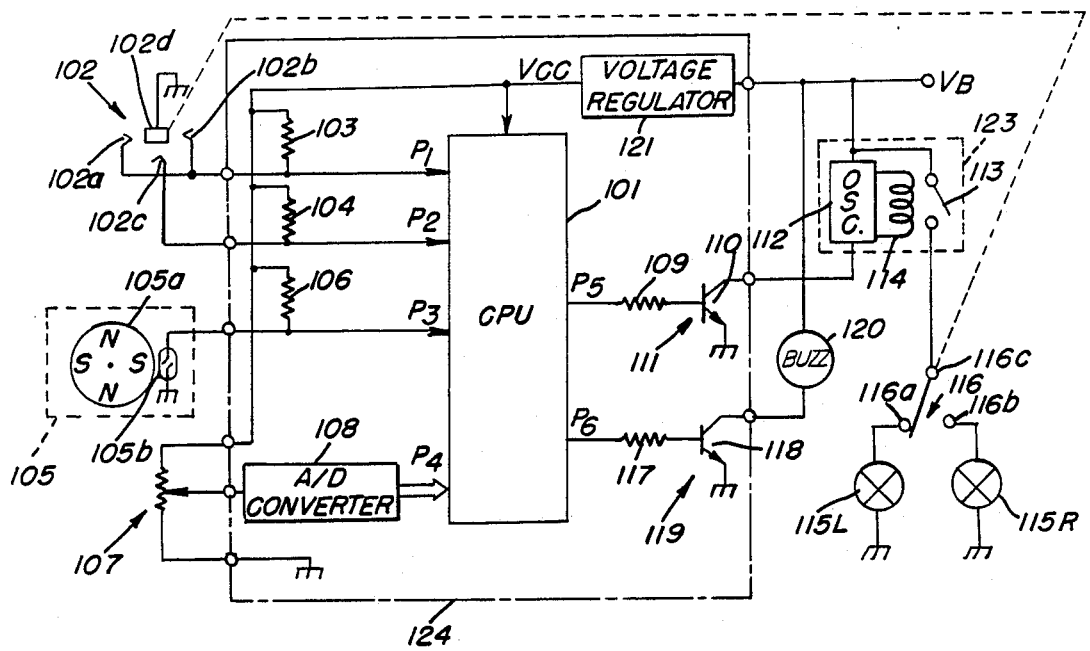
FIG. 7 is a circuit diagram showing another embodiment of the flasher device of the present invention including flasher cancellation communication.
Figure 9:
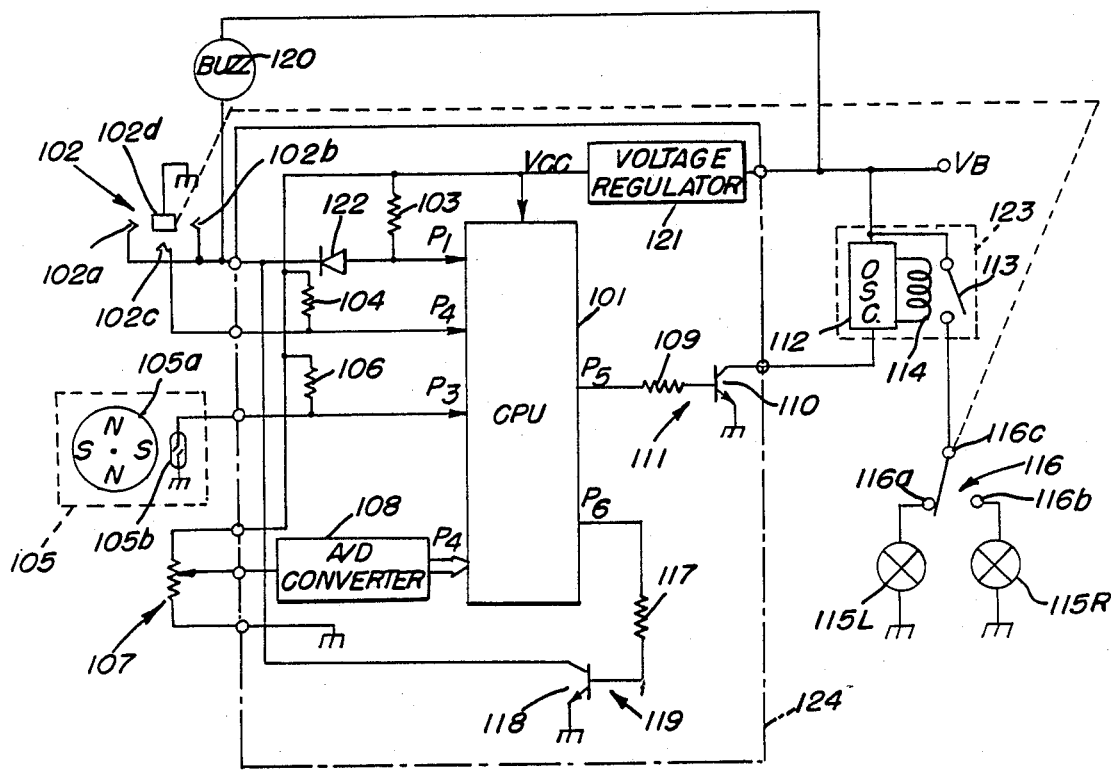
FIG. 9 is a circuit diagram showing another embodiment of the flasher device with flasher cancellation communications similar to that of FIG. 7.

Another embodiment of the present invention is illustrated in FIGS. 7-9 and is described below with respect to these drawings.

In a flashing device carried on a vehicle as shown in FIG. 7, there is a CPU (central processing unit) 101 consisting of, for example, an integrated circuit of one chip. The CPU 101 in the preferred embodiment includes a ROM, a RAM and a clock generating circuit in which the processing program and various data are pre-stored and which is provided with a plurality of input and output ports. The input ports $P_1$ and $P_2$ of the CPU 101 are connected to a flasher switch 102. The flasher switch is a non lock switch having three stationary contacts 102a, 102b and 102c. The stationary contacts 102a and 102b are commonly connected with the input port $P_1$ and the stationary contact 102c is connected with the input port $P_2$. Also, to the stationary contacts 102a and 102b are supplied a voltage $V_{cc}$ through a resistor 103, and the voltage $V_{cc}$ is supplied to the stationary contact 102c through a resistor 104. A movable contact 102d of the flasher switch 102 is grounded.

The input port $P_3$ of the CPU 101 is connected to a pulse generating device 105. The pulse generating device comprises a disc like magnet 105a which is connected to a speedometer cable (not shown) so as to rotate with the speed of the vehicle, and a lead switch 105b turns on and off according to the rotation of the disc like magnet 105a. One end of the lead switch 105b is grounded and the other end of the lead switch 105b is connected to the input port $P_3$. Also, a connecting line supplies the voltage $V_{cc}$ to the input port $P_3$ through the resistor 106. The input port $P_4$ of the CPU 101 is connected to a handle angle sensor 107 through an A/D (Analog/Digital) converter 108. The handle angle sensor 107 consists of a potentiometer generating a voltage according to a rotary angle of the handle in relation to a reference position of the handle (not shown).

The output port $P_5$ of the CPU 101 is connected to a flasher driving circuit 111 consisting of a resistor 109 and a NPN transistor 110. A base of the transistor 110 is connected to the output port $P_5$ through the resistor 109. An emitter of the transistor 110 is grounded. A collector of the transistor 110 is supplied a battery voltage $V_B$ through an oscillator 112. The oscillator is constructed of a flasher relay 123 which has a flasher relay switch 113 and a flasher relay coil 114 integrally made therewith. When the transistor 110 turns on, the voltage $V_B$ is applied to the oscillator 112 and the flasher relay coil 114 is intermittently energized according to an oscillating signal of the oscillator 112, whereby the flasher relay switch 113 turns on and off. One end of the flasher relay switch 113 is supplied with the voltage $V_B$, and the other end of the flasher relay switch 113 is connected to a movable contact 116c of a direction indicating and selecting switch 116 for selecting one of direction indicating lamps 115L and 115R. The direction indicating and selecting switch 116 consists of a lock switch and is associated with the same manipulator as is the flasher switch 102. One stationary contact 116a of the selecting switch 116 is grounded through the direction indicating lamp 115L, and the other stationary contact 116b is grounded through the direction indicating lamp 115R.

The output port $P_6$ is connected to a buzzer driving circuit 119 consisting of a resistor 117 and a NPN transistor 118. The output port $P_6$ is connected to a base of the transistor 118 through the resistor 117 and an emitter of the transistor 118 is grounded. A collector of the transistor 118 is supplied with the battery voltage $V_B$ through a buzzer 120. The voltage $V_{cc}$ is obtained by stabilizing the battery voltage $V_B$ by means of a voltage regulator 121 and is supplied as a power voltage of the CPU 101.

Next, actuation of the flasher device carried on the vehicle according to the teachings of the present invention will be described according to a function flow chart of the CPU 101 shown in FIG. 8. The CPU 101 processes the program pre-stored in the ROM repeatedly according to clock pulses when the voltage $V_{cc}$ is supplied thereto.

Firstly, when the manipulator is displayed, for example, in a required direction, the direction indicating and selecting switch 116 is placed in the ON state in contact with the stationary contact 116a as shown in FIG. 7, whereby the movable contact 102d and the stationary contact 102a of the flasher switch 102 are connected in the ON state. As a result, a level of the input port $P_1$ inverts from a high level to a low level and only during the flasher operation becomes a low level. This low level leads to a flasher turning on signal, and the CPU 101 determines whether the flasher turning on signal has been generated in the program processing (step 151). If the flasher turning on signal is generated, the output port $P_5$ is retained at the high level (step 152), and the output port $P_6$ is brought to the high level for a required time "t" (step 153). Then a flag F is set to "1" in order to store a fact that the flasher is driving (step 154). The high level of the output port $P_5$ is supplied to the base of the transistor 110 as a flasher driving signal through the resistor 109 thereby to turn on the transistor 110. By turning on of the transistor 110, the voltage $V_B$ is supplied to the oscillator 112 so as to start the oscillation of the oscillator. By this, since the flasher relay coil 114 is intermittently energized and the flasher relay switch 113 turns on and off, at the ON state of the flasher relay switch 113 the electric current flows to ground through the flasher relay switch 113, the flasher switch 116 and the direction indicating lamp 115L, thereby to flash the lamp 115L. On the one hand, the high level of the output port $P_6$ is supplied to the base of the transistor 113 as a buzzer driving signal through the resistor 117 so as to turn on the transistor 118. By turning on of the transistor 118, the voltage $V_B$ is supplied to the buzzer 120, whereby the buzzer rings for the required time "t" so as to generate an announcement sound. This announcement sound is given to the driver as a start of the flasher actuation.

When the manipulator of the switches 102 and 116, for example, is pressed, the condition of the switch 116 is maintained and the movable contact 2 and the stationary contact 102c of the flasher switch 102 contact in the ON state. By this, the input port $P_2$ of the CPU 101 inverts from the high level to the low level so as to become in the low level only during the pressing operation. The low level forms a manual OFF signal, and the CPU 101 discriminates whether the manual OFF signal has been generated in the case where the flasher turning on signal is not generated (step 155). If the manual OFF signal is generated, the output port $P_5$ is maintained at the low level (step 156), and the output port $P_6$ is brought to the high level (step 157). Also, the flag F is reset to "0" (step 158). By maintaining the output port $P_5$ at the low level, the transistor 110 turns off and the oscillator 112 stops its oscillation. Therefore, since the flasher relay coil 114 continues to deenergize and the flasher relay switch 113 turns OFF, the direction indicating lamp 115L stops its flashing. Also, as the output port $P_6$ is set to a high level, as mentioned above, the buzzer 120 rings for the required time "t" so as to generate an announcement sound. This announcement sound is given to the driver as stopping of the flasher actuation.

Also, when the manipulator, for example, is displaced in parallel in the other required direction, the direction indicating and selecting switch 116 is placed in the ON state to the stationary contact 116b and at the same time, the movable contact 102d and the stationary contact 102b of the flasher switch 102 are placed in the ON state. Therefore, the direction indicating lamp 115R flashes according to the same actuation as the case where the movable contact 102d and the stationary contact 102a are placed in the ON state as mentioned above.

The CPU 101 determines whether the flag F is equal to "1" in a case where the manual OFF signal is not generated (step 159). If F=1, since the flasher is actuating, the CPU 101 determines whether the handle has turned over the required angle from the time when the flasher ON signal has generated (step 160). That is, since to the input port $P_4$ is supplied handle angle data from the A/D converter 108, the CPU 101 reads in this data and determines whether a difference between the handle angle at the point of time of the occurrence of the flasher ON signal and a present handle angle exceeds the required angle. If the handle does not rotate over the required angle from the point of time of the occurrence of the flasher ON signal, the CPU 101 determines whether a running distance from the point of time of the occurrence of the flasher ON signal is above a required distance (step 161). That is, since to the input port $P_3$ is supplied a pulse from the pulse generating device 105 according to every running of a unit distance, the running distance from the point of time of the occurrence of the flasher ON signal is obtained by counting this pulse by means of a counter (not shown). The CPU 101 determines whether the detected running distance is above the required distance. If the handle turns from the point of time of the occurrence of the flasher ON signal above the required angle, or the running distance from the point of time of the occurrence of the flasher ON signal is above the required distance, it is determined as an occurrence of an automatic cancelling signal, and by performing the steps 156 to 158, the output port P$_5$ is maintained at the low level. Then, the output port P$_6$ is brought to the high level for the required time "t" and also, the flag F is reset to "0". Accordingly, the direction indicating lamp 115L or 115R stops its flashing and the buzzer 120 rings for the required time "t" so as to generate the announcement sound whereby the stopping of the flasher actuation is informed to the driver.

Further, the discrimination of the step 160 may be intended to detect a return rotation of the handle turning left or right by determining whether the handle has turned above the required angle in a turning direction which is set according to the selecting condition of the direction indicating and selecting switch 116.

FIG. 8 shows another embodiment of the present invention. In this flasher device, with the stationary contacts 102a and 102b of the flasher switch 102 are respectively connected one end of the buzzer 120 and the collector of the transistor 118. The other end of the buzzer 120 is supplied with the voltage V$_B$. The connecting portion of the stationary contacts 102a, 102b are connected through a diode 122 to the input port P$_1$. Diode 122 is provided as a counter current preventing diode to prevent the flow of the electric current from the connecting portion of the stationary contacts 102a and 102b to the input port P$_1$ side. Resistor 103 is connected to supply voltage V$_{cc}$ to the input port P$_1$. The other structure of FIG. 9 is similar to the device shown in FIG. 7. In such a structure, the movable contact 102d and the stationary contact 102a or 102b of the flasher switch are placed in the ON state by manipulating the manipulator. Then, when the flasher ON signal generates, the announcement sound is generated for the manipulating period by driving the buzzer 120. When the manual OFF signal generates and the automatic OFF signal generates, the announcement sound is generated by the buzzer 120 for the required time "t". In the case of the device according to this embodiment, it makes it possible to reduce the number of terminals of a control circuit 124 having the CPU 101, compared with the device shown in FIG. 6.

Further, without performing such a connection in the stationary contacts 102a and 102b, the device may be constructed so that the buzzer 120 and the collector of the transistor 118 are connected with the stationary contact 102c of the flasher switch and that the diode 122 is connected between the connecting portion of the stationary contact 102c and the input port P$_2$ side. In this case, when the manual OFF signal generates, the announcement sound is generated by the buzzer 120 for the manipulating period. When the automatic cancelling signal generates, the announcement sound is generated for the required time "t" by means of the buzzer 120.

Also, in each of the aforesaid embodiments of FIGS. 7-9, when the automatic cancelling signal generates, the buzzer 120 rings for the required time "t". However, the buzzer 120 may be rung, for example, for two times intermittently in order to distinguish from the other ringing. When manipulating, since the driver can know the flasher actuating condition, it may not be necessary to hear the ringing of the buzzer. Accordingly, it may be provided to ring the buzzer only on the automatic cancellation.

In each of the aforesaid embodiments, a lamp is used as each light emitting element, but a light emitting diode may be used.

As mentioned above, in the flasher device of the present invention, the breakdown of the filament of the lamp can be determined from the change in the lamp flashing speed during the actuation of the driving switch. As this detection is from the accumulated voltage of the capacitor connected in series or parallel with the series circuit of the plurality of lamps and the starting switch, it is unnecessary to provide the current detecting resistor in the current path of the lamp. Accordingly, it is possible to supply electric power to the lamps without such a current detecting resistor and thus it is possible to improve the luminous intensity of the lamps.

As mentioned above, in the flasher device of one embodiment of the present invention, the parallel circuit of the switching element and the capacitor is connected in series with respect to the plurality of lamps connected in parallel with each other, and the breakdown of a filament is detected according to the rising of the accumulated voltage due to charging of the capacitor in the OFF state of the switching element. Accordingly, it is unnecessary to provide the current detecting resistor in the lamp current path when turning on the lamp. Also, it is possible to prevent a wasteful consumption of the electric power since the charging of the capacitor is rapidly completed when the switching element is in the OFF state. Also, since it is unnecessary to provide a mechanical switching element, such as a relay switch in the prior art device, it is possible to miniaturize the flasher device and to improve its reliability.

According to another aspect of the flasher device of the present invention, when carried on a vehicle, the announcement sound may be generated at the point of time at which the automatic cancelling actuation automatically stops the flashing of the light emitting element of the direction indicating lamp or the like. Therefore, it is possible to easily confirm the automatic cancellation of the flashing of the light emitting element. Also, because the announcement sound is not generated by means of the buzzer or the like during the flashing, it has an advantage that the consumption of the electric power is reduced.

The present invention described above with reference to the accompanying drawings describes several preferred embodiments of the flashing device constructed in accordance with the teachings of the present invention. It should be understood, however, that one of ordinary skill in the art could construct a variety of recirculating document handling devices in accordance with the teachings of the present invention. It should therefore be understood that the present invention is not limited by the above described preferred embodiments. The present invention is defined by the claims appended hereto, which are intended to solely define the present invention including such changes and modifications as would occur to one of ordinary skill in the art within the spirit and scope of the appended claims.

What is claimed:

1. A flasher device for use in a vehicle comprising:
    at least two groups of indicator lamps;
    a flasher starting switch for selecting a selected group of said at least two groups of indicator lamps, said flasher starting switch having a plurality of stationary contacts and connected to a said group of indicator lamps;
    means for supplying an intermittent voltage to a selected said group of indicator lamps to flash said selected group of lamps; said means for supplying, said flasher starting switch and said selected group of indicator lamps forming a complete current path;

a capacitor operably connected in parallel with said groups of indicator lamps and being charged by said intermittent voltage, a rate of change of the voltage across said capacitor being related to the resistance of said selected group of indicator lamps; and control means, connected to monitor the voltage across said capacitor, for controlling said means for supplying to vary the frequency of generation of said intermittent voltage, said control means determining the resistance of said selected group of indicator lamps from a rate of change of the voltage across said capacitor and for changing said frequency of generation of said intermittent voltage in response thereto;

the change of resistance of said selected group of indicator lamps and the resultant changing of said frequency of generation of said intermittent voltage indicating a failure of a filament of one of said indicator lamps;

said capacitor monitoring the resistance of said selected group of indicator lamps without a significant reduction of voltage or power supplied said selected group of indicator lamps.

2. The device of claim 1 wherein said means for supplying comprises:

a power supply;

oscillator means for developing an oscillator frequency, said oscillator frequency being selectable between first and second frequencies;

an intermittent power supply switch, responsive to said oscillator means and serially connected between said power supply and said flasher starting switch, for selectively connecting said power supply to said selected group of indicator lamps through said flasher starting switch.

3. The device of claim 2 wherein said control means monitors the discharge time of said capacitor to determine the resistance of said selected group of indicator lamps.

4. The device of claim 3 wherein said control means comprises:

counter means for developing a voltage change time count of the time it takes for the voltage across the capacitor to fall from a fully charged voltage to a reference voltage level; and means for comparing the voltage change time count with a reference count and developing a filament damage signal if said voltage change time count exceeds said reference count.

5. The device of claim 4 wherein said oscillation means is responsive to said filament damage signal to change frequency of said oscillator means to indicate filament damage by changing the flashing rate of the remaining indicator lamps of said selected group.

6. The device of claim 1 further comprising:

sound generation means for developing an audible indication of said flashing;

flashing reset means for automatically disabling said means for supplying an intermittent voltage in response to the satisfaction of a condition; and means for enabling said sound generator means for a predetermined time period in response to operation of said flashing reset means.

7. The device of claim 6 wherein said condition is the movement of the vehicle for greater than a predetermined distance while said flasher device is enabled.

8. The device of claim 6 wherein said device further comprises a handle connected to said flasher starter switch; and means, connected to said handle, for developing said condition when the angle of a handle exceeds a predetermined angle with respect to its rest position.

9. A flasher device for use in a vehicle comprising:

at least two groups of indicator lamps including filaments;

a flasher starting switch for selecting a selected group of said at least two groups of indicator lamps, said flasher starting switch having a plurality of stationary contacts and connected to said groups of indicator lamps;

supplying means for supplying an intermittent current alternating between first and second states to a selected said group of indicator lamps to flash said selected group of lamps, said supplying means, said flasher starting switch and said selected group of indicator lamps forming a complete current path;

time width measuring means for measuring the time width of changing pulses of said intermittent current caused by the time constant established by the changes in resistance of said filaments after said intermittent current is changed to a different said state;

detecting means connected to said time width measuring means for detecting breakdown of one of said filaments when said time width is changed and for outputting a break down signal;

control means connected to said detecting means for controlling said supplying means to vary the frequency of generation of said intermittent voltage in response to said breakdown signal.

10. The device of claim 9 wherein said means for supplying comprises:

a power supply;

oscillator means for developing an oscillator frequency, said oscillator frequency being selectable between first and second frequencies;

an intermittent power supply switch, responsive to said oscillator means and serially connected between said power supply and said flasher starting switch, for selectively connecting said power supply to said selected group of indicator lamps through said flasher starting switch.

11. The device of claim 10 wherein said time width measuring means includes a capacitor connected in parallel to said selected group of indicator lamps, said detecting means monitoring the discharge time of said capacitor to determine the resistance of said selected group of indicator lamps.

12. The device of claim 10 wherein said time width measuring means includes a capacitor connected in series to said selected group of indicator lamps, said detecting means monitoring the change time of said capacitor to determine the resistance of said selected group of indicator lamps.

13. The device of claim 11 wherein said detecting means comprises:

counter means for developing a voltage change time count of the time it takes for the voltage across the capacitor to fall from a fully charged voltage to a reference voltage level; and means for comparing the voltage change time count with a reference count and developing a filament damage signal if said voltage change time count exceeds said reference count.

14. The device of claim 13 wherein said oscillation means is responsive to said filament damage signal to change frequency of said oscillator means to indicate filament damage by changing the flashing rate of the remaining indicator lamps of said selected group.

15. The device of claim 9 further comprising:
sound generation means for developing an audible indication of said flashing;
flashing reset means for automatically disabling said means for supplying an intermittent voltage in response to the satisfaction of a condition; and
means for enabling said sound generator means for a predetermined time period in response to operation of said flashing reset means.

16. The device of claim 15 wherein said condition is the movement of the vehicle for greater than a predetermined distance while said flasher device is enabled.

17. The device of claim 15 wherein said condition occurs when the angle of a handle exceeds a predetermined angle.

18. A flasher device for use in signalling vehicle direction comprising:

a group of direction indicating lamps;
drive means for selectively supplying an intermittent voltage at a selected frequency to said group of lamps to cause them to flash;
voltage sensor means, operatively connected to said group of lamps, for sensing a resistance related voltage across said group of lamps;
control means, responsive to said voltage sensor means and operatively connected to said drive means for detecting a change in said resistance related voltage to thereby detect a failure of one or more lamps, said control means controlling said drive means to vary the frequency at which said intermittent voltage is supplied to said group of lamps to indicate failure of at least one of said group of lamps;
said voltage sensor means sensing said resistance related voltage without substantial insertion of impedance in series with said group of lamps, thereby preventing significant reduction of voltage or power supplied said group of lamps.

19. The device of claim 18 wherein said sensor means is provided in parallel with said group of lamps.

20. The device of claim 19 wherein said sensor means includes a capacitor.

* * * * *